United States Patent
Kim et al.

(10) Patent No.: US 10,044,697 B2
(45) Date of Patent: Aug. 7, 2018

(54) MULTI-LEVEL AUTHENTICATION FOR ONBOARD SYSTEMS

(71) Applicant: VISA INTERNATIONAL SERVICE ASSOCIATION, San Francisco, CA (US)

(72) Inventors: Nancy Kim, San Francisco, CA (US); Sharon Gibson, Foster City, CA (US); Kelvan Howard, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 15/074,908

(22) Filed: Mar. 18, 2016

(65) Prior Publication Data

US 2017/0272418 A1    Sep. 21, 2017

(51) Int. Cl.
*G06F 21/00* (2013.01)
*H04L 29/06* (2006.01)
*H04L 29/08* (2006.01)

(52) U.S. Cl.
CPC .............. *H04L 63/08* (2013.01); *H04L 63/20* (2013.01); *H04L 67/12* (2013.01)

(58) Field of Classification Search
None
See application file for complete search history.

(56) References Cited

U.S. PATENT DOCUMENTS

| 2009/0024525 A1 | 1/2009 | Blumer et al. |
| 2014/0189350 A1* | 7/2014 | Baghdasaryan ...... H04L 9/3271 713/168 |
| 2015/0058224 A1 | 2/2015 | Gaddam et al. |
| 2015/0161742 A1 | 6/2015 | Bernard et al. |
| 2015/0220916 A1 | 8/2015 | Prakash et al. |
| 2015/0317615 A1 | 11/2015 | Bryant |

FOREIGN PATENT DOCUMENTS

| WO | WO 2015016929 A1 * | 2/2015 | ............. G06Q 20/36 |
| WO | 2015099679 | 7/2015 | |

OTHER PUBLICATIONS

PCT/US2017/019751, "International Search Report and Written Opinion", dated Jun. 8, 2017, 14 pages.

\* cited by examiner

*Primary Examiner* — Alexander Lagor
(74) *Attorney, Agent, or Firm* — Kilpatrick Townsend & Stockton LLP

(57) ABSTRACT

Described herein is a platform and method for providing multi-level authentication by an onboard system in relation to a transaction. In response to receiving information related to a transaction, one or more authentication policies may be identified and provided to an onboard system associated with the transaction. The authentication policies may be executed by the onboard system to generate a result set indicating a pass/fail for each authentication policy. Once the result set has been generated, success actions and/or failure actions associated with each authentication policy may be executed in accordance with the generated result set.

22 Claims, 6 Drawing Sheets

MULTI-LEVEL AUTHENTICATION FOR ONBOARD SYSTEMS

CROSS-REFERENCES TO RELATED APPLICATIONS

Not Applicable

BACKGROUND

In recent years, consumer electronics have become increasingly integrated. Functionality that used to be available only on specific hardware devices is now available from multi-purpose devices. As users of various electronic devices become acclimated to this increased integration of functionality, users are demanding increased convenience in relation to conducted transactions. However, increasing the convenience of a transaction for a user often has an adverse effect on the security of that transaction. For example, making a transaction easier to conduct often increases the likelihood that the transaction will be fraudulently conducted. On the other hand, increasing the security of a transaction can make the transaction difficult to conduct for a user, and may make a user decide to forgo conducting the transaction entirely. Hence, architects of a system are often torn between making the system convenient for a user to conduct a transaction and making transactions conducted using the system more secure.

Embodiments of the invention address these and other problems, individually and collectively.

BRIEF SUMMARY

Embodiments of the invention are directed to a platform for providing multi-level authentication by an onboard system in relation to a transaction. In some embodiments, in response to receiving information related to a transaction, a processing computer may identify one or more authentication policies to be provided to an onboard system associated with the transaction. The authentication policies may be executed by the onboard system to generate a result set indicating a pass/fail for each authentication policy, resulting in multiple levels of authentication for a transaction. Once the result set has been generated by the onboard system, it may be provided to the processing computer and success actions and/or failure actions associated with each authentication policy may be executed in accordance with the generated result set.

One embodiment of the invention is directed to a method comprising receiving information associated with a transaction conducted using an account, identifying a set of authentication policies associated with the account, and identifying an onboard system associated with the account. Once each of these has been identified, the method comprises determining a subset of the set of authentication policies relevant to the transaction based on the information associated with the transaction and based on being compatible with the identified onboard system. The method further comprises providing the subset of the set of authentication policies to the onboard system and receiving a result set from the onboard system, the result set including a pass/fail indication for each of the subset of the set of authentication policies.

Another embodiment of the invention is directed to a server computer comprising a processor and memory including instructions that, when executed with the processor, cause the processing computer to perform the above described method.

Another embodiment of the invention is directed to a method comprising receiving, from a processing computer, transaction information associated with a transaction to be completed. The method further comprises identifying, based at least in part on one or more conditions indicated in the transaction information, a set of authentication policies to be executed to authenticate a user of the onboard system. The method further comprises executing each authentication policy in the set of authentication policies and generating a result set to include a pass/fail indicator for each authentication policy in the set of authentication policies. Finally, the method comprises providing the result set to the processing computer.

Another embodiment of the invention is directed to an onboard system comprising a processor and memory including instructions that, when executed with the processor, cause the processing computer to perform the above described method.

These and other embodiments of the invention are described in further detail below.

DETAILED DESCRIPTION

Figure 1:
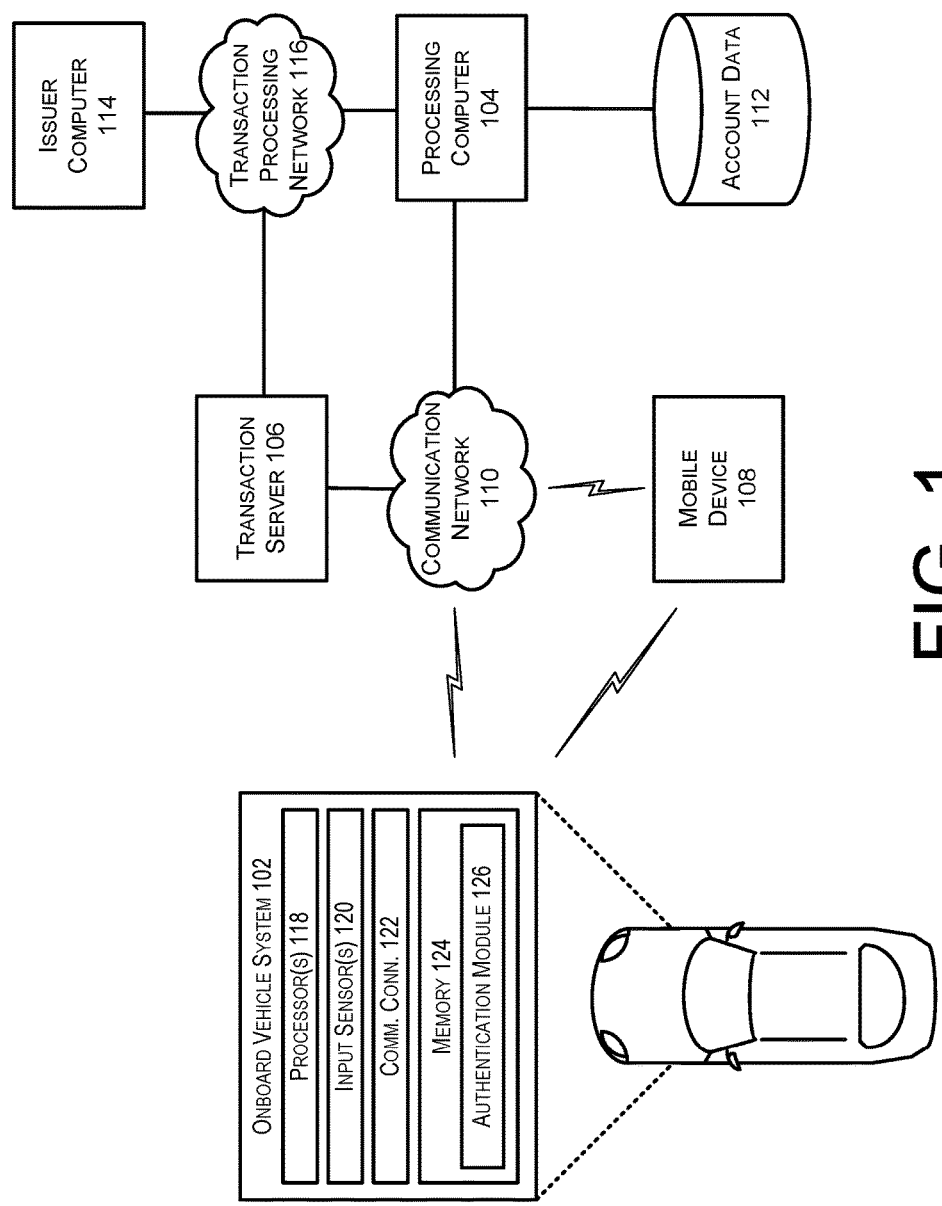
FIG. 1 depicts an example architecture capable of implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to systems, methods, apparatuses, and computer readable media for providing Prior to discussing the details of some embodiments of the present invention, description of some terms may be helpful in understanding the various embodiments.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

An "acquirer" may typically be a business entity (e.g., a commercial bank) that has a business relationship with a particular merchant or other entity. Some entities can perform both issuer and acquirer functions. Some embodiments may encompass such single entity issuer-acquirers The term "authentication" and its derivatives may refer to a process by which the credential of an endpoint (including but not limited to applications, people, devices, processes, and systems) can be verified to ensure that the endpoint is who they are declared to be.

An "authentication policy" may include any setting, instruction, or set of instructions that indicates an authentication technique to be performed. In some embodiments, an authentication policy may include a set of computer executable instructions that, when executed by a processor, cause one or more authentication techniques to be initiated. In some embodiments, the authentication policy may be associated with a particular type of input sensor and/or input data type such that execution of the authentication policy will cause the input sensor to activate and/or the input data type to be collected. In some embodiments, the authentication policy may be associated with an acceptable range or acceptable value for the input data. In some embodiments, the authentication policy may be associated with one or more success actions and/or failure actions that may be executed in the event of a pass or failure (respectively). In some embodiments, a failure of one authentication policy may trigger execution of a second authentication policy. In some embodiments, an authentication policy may take the form of an extensible markup language (xml) document or text-based document. For example, an authentication policy may be an xml document that includes data in a format similar to:

```
<Authentication_Policy_Title>
    <compatibility>
        <Model_A>
        <Model_B>
        <Model_C>
    </compatibility>
    <applicability>
        <currency.threshold(30.00)>
    </applicability >
    <execution>
        <onboard_system.keypad.getpin( )>
    </execution>
    <success_actions>
        <processing_computer.transmit_message
        (age_restricted_21)>
    </success_actions>
    <failure_actions>
        <processing_computer.decline_transaction( )>
    </failure_actions>
</Authentication_Policy_Title>
```

In this example, the authentication policy may be parsed to identify onboard system models that are compatible with the authentication policy (depicted as "compatibility"), conditions under which the authentication policy may be found relevant ("applicability"), one or more actions to take during execution of the authentication policy (depicted here as the acting system, an input sensor, and a function to be executed), and one or more success and failure actions. It should be noted that the provided example authentication policy is intended as a non-limiting example; a number of equivalent policies may be envisioned by one skilled in the art.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

A "failure action" may include an indication of an action to be executed upon determining that an executed policy (e.g., an authentication policy) has failed. A failure action may be stored in association with an authentication policy (e.g., within a database table or within an xml document). Failure actions may be executed by the processing computer or the onboard system (e.g., the failure action may specify by which entity it is to be performed). In some embodiments, multiple failure actions may be associated with an authentication policy. A failure action may cause a transaction to be declined or rejected.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

A "mobile application" may be any application stored on, and executed from, a mobile device. In some embodiments, a mobile application may be used to make a payment via a mobile device. In some embodiments, a mobile payment application may be an e-wallet or digital wallet application. In some embodiments, the mobile payment application may be linked to one or more payment accounts. In some embodiments, the mobile payment application may store one or more "tokens" or representations of payment accounts. In some embodiments, the mobile payment application may be linked to a decentralized virtual currency (e.g., bitcoins). In some embodiments, a mobile payment application may include an application used to complete a transaction without the use of currency. For example, the mobile payment application may complete a transaction using reward points or store credit.

A "mobile device" may be a device that includes one or more electronic components (e.g., an integrated chip) that can be transported and operated by a user. A mobile device may provide remote communication capabilities to a network. The mobile device can be configured to transmit and receive data or communications to and from other devices. A mobile device may be in the form of any portable device such as a mobile phone (e.g., smart phone, cellular phone, etc.), a tablet, a portable media player, a personal digital assistant device (PDA), a wearable computing device (e.g., a smart watch), an electronic reader device, etc., or in the form of a card (e.g., a smart card) or a fob, etc. Examples of mobile devices may also include portable computing devices (e.g., laptops, netbooks, ultrabooks, etc.).

An "onboard system" may include any suitable system that is present on an apparatus. An onboard vehicle system may be an example of an onboard system. In some embodiments, an onboard system may include any processing device capable of receiving and executing one or more authentication policies. In some embodiments, an onboard system may respond to receiving authentication policies with a generated result set. In some embodiments, an onboard system may be installed in a vehicle. For example, an onboard system in a vehicle may be associated with a payment account such that a transaction may be completed by the onboard system as it approaches a location associated with the transaction. In some embodiments, the onboard system may be in the form of a processing computer.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "success action" may include an indication of an action to be executed upon determining that an executed authentication policy has been passed. A success action may be stored in association with an authentication policy (e.g., within a database table or within an xml document). Success actions may be executed by the processing computer or the onboard system (e.g., the success action may specify by which entity it is to be performed). In some embodiments, multiple success actions may be associated with an authentication policy. A success action may cause additional instructions to be provided to a merchant entity or user.

A "transaction server" may include any computing device capable of receiving a request for a transaction and processing information related to the requested transaction. In some embodiments, the transaction server may be affiliated with an electronic marketplace or a retail entity that maintains an internet presence. A transaction server may support transactions to acquire resources (e.g., goods and/or services). In some embodiments, a user may request a transaction by visiting a website affiliated with the transaction server and selecting one or more items to purchase. The transaction server may be in communication with other devices via a network connection.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

Details of some embodiments of the present invention will now be described.

Embodiments of the disclosure are directed to a platform in which multiple levels of authentication may be executed for a transaction. Upon initiation of a transaction utilizing the platform, a processing computer may be provided with information related to the transaction. The processing computer may select various authentication policies to be executed by the onboard system in relation to the transaction. In some embodiments, authentication policies are selected based on information related to a transaction. In some embodiments, one or more levels of authentication for an account may be customized (e.g., configured) by a user associated with the account. Upon identifying relevant authentication policies, they may be executed by the processing computer or provided to an onboard system or mobile device associated with the account.

In some embodiments, an authentication policy may comprise a set of computer executable instructions that, when executed by a processor, cause input data to be collected by an input sensor associated with the onboard system. The collected input data may be compared to provided parameters to determine if the authentication policy has passed or failed. Once each of the authentication policies has been executed, various actions associated with authentication policy successes and/or failures may be initiated.

FIG. 1 depicts an example architecture capable of implementing at least some embodiments of the current disclosure. The architecture may include an onboard vehicle system 102 in communication with one or more of a processing computer 104, a transaction server 106, and a mobile device 108 via one or more networks 110. The processing computer 104 may have access to one or more sources of account data 112. In some embodiments, account data 112 may comprise information maintained by a third party entity (e.g., an entity unaffiliated with the processing computer 104). The architecture may also include an issuer computer 114 accessible via a payment processing network 116.

The onboard vehicle system 102 may include one or more processors 118 capable of processing user input. The onboard vehicle system 102 may also include one or more input sensors 120 for collecting input. In some embodiments, the input may include user provided input. As is known in the art, there are a variety of input sensors 120 capable of detecting user provided input, such as keyboards, mice, microphones, cameras, motion sensors, etc. In some embodiments, the input may include input related to one or more conditions of the onboard vehicle system 102, the user, or a vehicle in which the onboard system is installed. As is known in the art, there are a variety of input sensors 120 capable of detecting input related to one or more conditions, such as accelerometers, cameras, pressure sensors, thermometers, a global positioning system (GPS), etc. In some embodiments, the input sensors 120 may include devices for capturing biometric information, such as a fingerprint scanner, a retina scanner, a camera used for facial recognition, a microphone capable of capturing voice data, etc.

In some embodiments, the onboard vehicle system 102 may include a communication connection 122 configured to enable communication between the onboard vehicle system 102 and another electronic device (e.g., mobile device 108). Examples of communication connection 122 may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, communication connection 122 may include an infrared communication device. Embodiments of one or more modules on the onboard vehicle system 102 may be stored and executed from its memory 124. In some embodiments, the communication connection 122 may include both long range and short range communication means. For example, the communication connection may include an antenna configured to connect to a cellular network in order to enable communication with various other components of the depicted architecture. Additionally, the communication connections may include short range communication means for establishing a short range communication session with a mobile device 108.

Turning to the contents of the memory 124 in more detail, the memory 126 may include an operating system and one or more modules configured to cause the processors 118 to carry out instructions in accordance with at least some embodiments of the disclosure. For example, the memory 124 may include an authentication module 126 configured to work with the processor 120 to process one or more authentication policies in relation to a transaction.

In some embodiments, the authentication module 126 may be configured to, when executed by processors 118, cause the onboard vehicle system 102 to process one or more authentication policies related to a transaction and initiate one or more authentication procedures associated with the authentication policies. For example, the authentication module 126 may be initiated by the onboard vehicle system 102 upon receiving a set of authentication policies associated with a transaction. The set of authentication policies may include a set of instructions to perform one or more authentication techniques. For example, the onboard system may receive an instruction to require that a user enter a pin code. In this example, the onboard system may communicate with a mobile application installed on a mobile device operated by the user, which may then cause the mobile device to request a pin code. In some embodiments, the authentication policies may include specifications particular to the user to be authenticated. The onboard system may be provided with instructions to confirm biometric information for a user (e.g., a user's retina patterns, fingerprint, or weight). The onboard system may cause one or more sensors to activate in order to confirm the biometric data, which may be done with or without the user's knowledge. For example, the onboard system may receive an indication of the user's weight. The onboard system may then activate one or more pressure sensors in the seat of a vehicle in order to determine whether a person sitting in the seat is likely the user. Weight data collected from the sensors may then be compared to the received weight data to determine whether it is within an acceptable range.

In some examples, the communication network 110 and/or the transaction processing network 116 may include any one or a combination of many different types of networks, such as cable networks, the Internet, wireless networks, cellular networks, and other private and/or public networks. In addition, the communication network 110 and/or transaction processing network 116 may comprise multiple different networks. For example, the onboard vehicle system 102 may utilize a 3G network to communicate with a wireless router, which may then route the communication over a public network (e.g., the Internet) to the processing computer 104. In some embodiments, the transaction processing network 116 may be an electronic payment network (e.g., VisaNet).

Issuer computer 114 may be any computing device or plurality of computing devices configured to receive an authorization request message for a transaction, authorize or decline the transaction, and provide an authorization response message based on whether the transaction has been authorized or declined. The issuer computer 114 may determine whether to authorize or decline the transaction based on information associated with the transaction. In some embodiments, the issuer computer 114 may be an issuer of a payment account (e.g., a credit card).

Transaction server 106 may be any computing device or plurality of computing devices configured to initiate a transaction. In some embodiments, the transaction server 106 may be associated with an electronic commerce site. For example, the transaction server may maintain a catalog of items and/or services available for purchase by a user. The transaction server may also be associated with one or more physical locations. For example, the transaction server 106 may be associated with a retailer that maintains one or more physical storefronts.

In some embodiments, the transaction server 106 may be in communication with an acquirer computer. An acquirer computer may be any computing device or plurality of computing devices configured to process transaction information received from the transaction server 106 and generate an authorization request message to be transmitted to the issuer computer 114. In some embodiments, the acquirer computer may be owned and/or operated by a banking institute with which the operator of the transaction server 106 maintains an account.

The mobile device 108 may be any type of portable communication device such as, but not limited to, a mobile phone, a smart phone, a personal digital assistant (PDA), a laptop computer, a tablet PC, etc. Additionally or alternatively, the mobile device 108 may be any type of wearable technology device, such as a watch, earpiece, glasses, etc. It may also be an automobile with remote communication capabilities. In some embodiments, the onboard vehicle system 102 may communicate with the mobile device 108 directly. For example, the onboard vehicle system 102 may utilize a communication connection 122 (e.g., Bluetooth, BLE, infrared, WiFi, or any other suitable means of communication) to connect directly to the mobile device 108. In some embodiments, the onboard system may connect to the mobile device using a network connection (e.g., the Internet).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
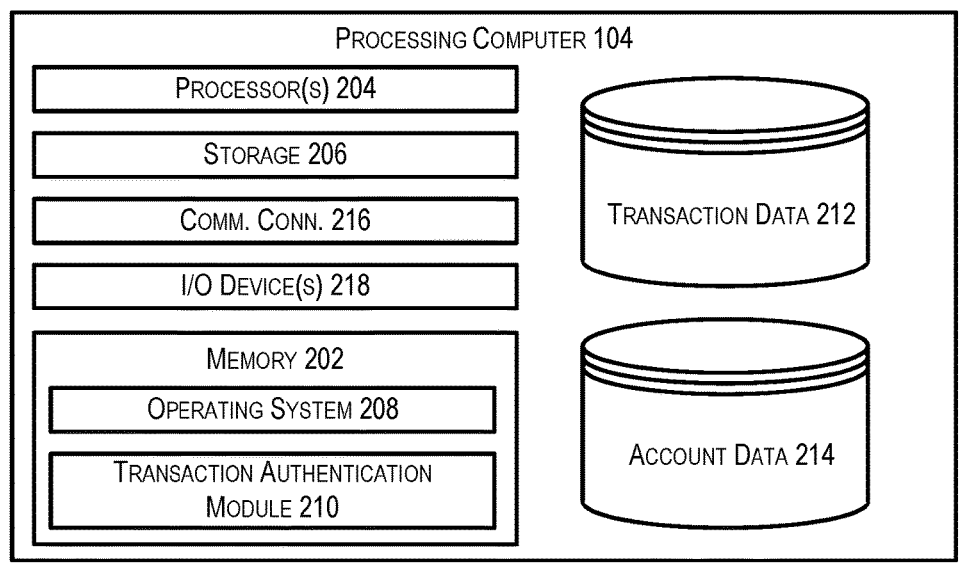
FIG. 2 depicts an illustrative example of an processing computer 104 capable of authenticating a transaction using a multi-level authentication platform in accordance with at least some embodiments.

FIG. 2 depicts an illustrative example of an processing computer 104 capable of authenticating a transaction using a multi-level authentication platform in accordance with at least some embodiments. The depicted processing computer 104 may be an example processing computer 104 of FIG. 1.

The processing computer 104 may be any type of computing device, including a remotely located server computer. Additionally, it should be noted that in some embodiments, the processing computer 104 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the processing computer 104 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of processing computer 104, the memory 202 may be volatile (such as random access memory (RAM)) and/or non-volatile (such as read-only memory (ROM), flash memory, etc.). The processing computer 104 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the memory 202 may include multiple different types of memory, such as static random access memory (SRAM), dynamic random access memory (DRAM) or ROM. Turning to the contents of the memory 202 in more detail, the memory 202 may include an operating system 208 and one or more application programs or services for implementing the features disclosed herein including at least a module for assessing authentication policies to be associated with one or more transactions and providing the authentication policies to an onboard system to be enforced (transaction authentication module 210). The memory 202 may also include transaction data 212, which provides data associated with one or more pending transactions and account data 214, which provides information on account information associated with one or more users. In some embodiments, the account data 214 may include user settings and/or authentication policies associated with the user. In some embodiments, the transaction data 212 and/or the account data 214 may be located outside of the processing computer 104. For example, one or more of these databases may be maintained by a third party entity (an entity unaffiliated with the processing computer 104).

The memory 202 and the additional storage 206, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of an onboard vehicle system and/or the processing computer 104. The processing computer 104 may also contain communications connection(s) 216 that enable the processing computer 104 to communicate with a stored database, another computing device or server, one or more terminal devices, and/or other devices on a network. The processing computer 104 may also include input/output (I/O) device(s) and/or ports 218, such as for enabling connection with a keyboard, a mouse, a pen, a voice input device, a touch input device, a display, speakers, a printer, etc.

Turning to the contents of the memory 202 in more detail, the memory 202 may include an operating system 208. One or more application programs or services for implementing the features disclosed herein, including a transaction authentication module 210, may also be stored in the memory 202. The transaction data 212 and account data 214 may comprise any suitable persistent data storage system. In some embodiments, the transaction data 212 and/or account data 214 may be stored in one or more databases. Information stored in the transaction data 212 or account data 214 may be accessed by the transaction authentication module 210 via a database query or any other suitable data retrieval means.

In some embodiments, the transaction authentication module 210 may, in conjunction with the processor 204, be configured to identify a set of authentication policies relevant to a transaction. In some embodiments, the relevant set of authentication policies may be identified based on user set preferences. For example, a user may set a preference or setting that indicates additional authentication measures to be taken for transactions over a threshold amount. In some embodiments, the set of authentication policies relevant to a transaction may be identified based on one or more products associated with the transaction. For example, the transaction may be a purchase transaction for one or more age-restricted items, such as tobacco products or alcohol. In another example, a product may be a person-specific product, such as a pharmacy order, in which it would be vital to ensure the identity of the user. In some embodiments, the relevant set of authentication policies may be identified based on one or more capabilities of the onboard system. For example, multiple authentication policies may be identified as being potentially relevant to a transaction, but the transaction authentication module 210 may determine, based on specifications of the onboard system, that only a subset of the potentially relevant authentication policies are capable of being executed by the onboard system. In this scenario, the transaction authentication module 210 may identify those authentication policies as being relevant.

In some embodiments, the transaction data 212 may comprise information on pending transactions related to a transaction server. For example, upon receiving a notification of a pending transaction from a transaction server, the processing computer 104 may record information related to the pending transaction to the transaction data 212. This information may include a set of items associated with the transaction as well as information related to each item (e.g., price, quantity, stock keeping unit (SKU) number, etc.), a location at which the transaction is to be conducted, payment credentials to be used in the transaction, and/or any other suitable transaction-related information. In some embodiments, transaction information may be removed from transaction data 212 and/or moved to an archive database upon determining that the transaction is no longer pending. In some embodiments, the transaction data 212 may be queried to identify one or more transactions related to a particular individual or account.

Figure 3:
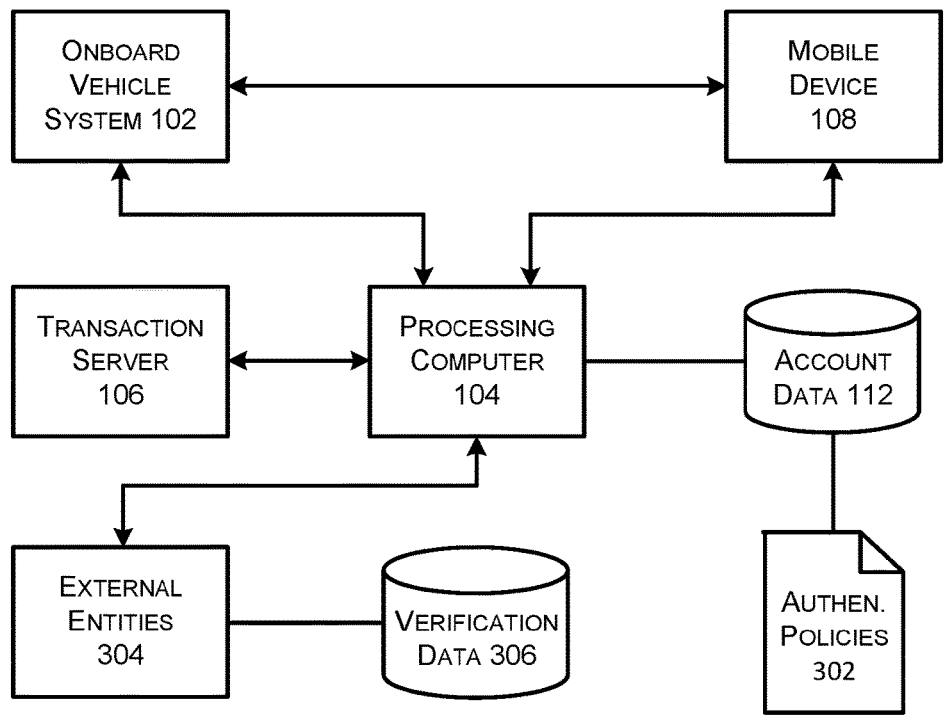
FIG. 3 depicts a data flow that may be implemented in accordance with at least some embodiments.

FIG. 3 depicts a data flow that may be implemented in accordance with at least some embodiments. The data flow depicted in FIG. 3, may be implemented at least by the example architecture depicted in FIG. 1. In FIG. 3, a transaction server 106 may receive a request to complete a transaction. In some embodiments, the transaction server 106 may be owned and/or operated by an electronic commerce entity (e.g., an online retailer). In some embodiments, the transaction server 106 may also receive an indication that the transaction should be completed at a particular location. For example, the transaction server 106 may receive a purchase request from a user. In this example, the user may select one or more items (e.g., goods and/or services) from an electronic marketplace maintained by the transaction server 106 (e.g., listed as being available for purchase on a website maintained by the transaction server 106). The received purchase request may include an indication of a physical location affiliated with the owner of the transaction server 106. In some embodiments, the user may select the one or more items from the electronic marketplace via the mobile device 108, the onboard vehicle system 102, or another client device connected to the communication network 110.

Upon receiving a request to complete a transaction, the transaction server 106 may provide the indication to a processing computer 104. In addition, the transaction server 106 may also provide details of the transaction and/or coordinates of the physical location at which the transaction is to be completed. The processing computer may identify a user account associated with the received transaction details. In some embodiments, the transaction details may include a payment instrument that is associated with an account maintained at the processing computer 104. In some embodiments, the transaction details may include a user name, email address, or identifier that may be mapped to a particular account holder. In some embodiments, the transaction details may include an indication of an onboard vehicle system 102 associated with a user. The processing computer 104 may utilize any number of transaction details to identify an account associated with the transaction. The transaction details may be compared to information stored in account data 112 to identify the account holder.

Once the processing computer 104 has identified an account associated with the transaction, it may then identify one or more authentication policies 302 to be associated with the transaction. In some embodiments, the processing computer 104 may identify a set of user preferences or other user settings provided by the account holder. For example, the account holder may indicate that certain authentication policies are to be applied if the transaction is over a threshold amount. In some embodiments, the account holder may indicate multiple threshold amounts, each associated with a different set of authentication policies. In some embodiments, the processing computer 104 may identify one or more legal requirements associated with the transaction. For example, the processing computer 104 may determine that the transaction includes alcohol, which is an age-restricted item. In this example, the processing computer may identify one or more authentication policies aimed at determining a user's age. Alternatively in this example, the processing computer 104 may already have confirmed the user's age, and may instead identify authentication policies aimed at confirming the user's identity. It should be noted that although the authentication policies 302 are described in FIG. 3 as being determined by the processing computer 104, in some embodiments, they may be determined by the onboard vehicle system 102. For example, transaction details may be provided to the onboard vehicle system 102 and the onboard vehicle system 102 may identify which authentication policies are relevant to the transaction based on the provided transaction details. In some embodiments, some or all of the identified authentication policies may be provided to a mobile device 108.

In some embodiments, the processing computer 104 may be configured to communicate with one or more external entities 304 (e.g., entities external to the processing computer 104) to retrieve verification data 306. For example, the processing computer 104 may be configured to query an account holder's license information from the Department of Motor Vehicles (DMV), which is an external entity. In response, the processing computer 104 may be provided with the requested license information, which may include information related to the user and/or an image of the account holder. In some embodiments, one or more external entities may be queried upon creation of an account with the processing computer. For example, the processing computer, upon being provided with a request to open an account for an account holder, may retrieve account holder specific data from the verification data 306 of the one or more of the external entities 304.

An identified set of authentication policies may be provided to the onboard vehicle system 102. In some embodiments, the onboard vehicle system 102 may also be provided with location information related to the location at which the transaction is to be completed. The onboard vehicle system 102 may be configured to execute one or more of the identified authentication policies upon determining that it has crossed a virtual barrier (e.g., a geofence). For example, the onboard vehicle system 102 may be configured to continually monitor its location (via a GPS device) and to determine when the onboard vehicle system 102 is within a predetermined distance of the indicated location. It should be noted that, in some embodiments, the processing computer 104 may be configured to receive location information from the onboard vehicle system 102 and to determine when the onboard vehicle system 102 is within a predetermined distance of the indicated location. In these embodiments, the processing computer 104 may provide the identified authentication policies to the onboard vehicle system 102 upon determining that it has crossed the virtual barrier.

The authentication policies may include computer executable instructions that, when executed by one or more processors of the onboard vehicle system, cause the onboard vehicle system to perform one or more authentication techniques. The onboard vehicle system may be configured to execute the one or more authentication techniques upon their receipt. For example, upon receiving an authentication policy from the processing computer 104, the onboard vehicle system 102 may perform an authentication technique associated with the authentication policy and report the results to the processing computer 104. In some embodiments, one or more of the authentication policies may be contingent on another authentication policy. For example, a second authentication policy may be executed in the event that a first authentication policy has failed to authenticate the account holder.

In some embodiments, at least some authentication policies may be configured to be executed by the onboard vehicle system without user interaction. For example, the processing computer 104 may acquire an image of the user (e.g., from a DMV). In this example, the image (or facial mapping data generated using the image) may be provided to the onboard vehicle system 102 with instructions to perform a facial recognition technique. The onboard vehicle system 102 may utilize one or more camera devices in the vehicle to collect image data depicting the current driver of the vehicle and compare it to the provided image data. In this example, the onboard vehicle system 102 may respond to the processing computer 104 with a statistical likelihood that the image is of the account holder. As described, this may be done automatically, without interaction by, or approval from, the account holder. In another embodiment, the provided authentication policies may include one or more preliminary authentication policies that may be executed without user interaction or direction prior to executing more invasive authentication policies. For example, the onboard vehicle system 102 may receive an account holder's weight along with instructions to compare it to the weight of the current driver and/or passenger. The onboard vehicle system may activate a pressure sensor in the seat of the vehicle to collect information on the driver's and/or passenger's weight. In the event that the weight of the current driver (or passenger) is not within an acceptable range of the received weight information, the onboard vehicle system 102 may execute a second authentication policy in which the account holder is asked to enter a pin into a mobile device 108. In this scenario, upon successful verification of the user, the user's current weight may be updated at the processing computer 104. In yet another example, authentication policies the processing computer 104 may determine vehicle settings such as seat positions, speedometer readings, and braking patterns to determine if they are in fact associated with a particular user.

In some embodiments, at least some authentication policies may be configured to be executed by the onboard vehicle system with user interaction. For example, the onboard vehicle system 102 may be provided with instructions to collect an audio sample from the account holder. In this example, the onboard vehicle system 102 may activate a microphone in the vehicle and prompt the user to speak. The audio information collected by the microphone may then be analyzed by the onboard vehicle system 102 or the processing computer 104 to determine a likelihood that the speaker is the account holder. In another example, the user may be prompted to enter a password or pin code. In another embodiment, the user may be asked to provide user details that may be confirmed against information maintained on the account holder.

In some embodiments, at least some authentication policies may be configured to be executed by a mobile device. The mobile device may or may not be in communication with the onboard vehicle system. For example, one or more authentication policies may require functionality that is provided by the mobile device 108 but not by the onboard vehicle system 102. The onboard vehicle system may be configured to establish a communication session with a mobile device owned and/or operated by the account holder. In some embodiments, an access key or other means of enabling a connection with the device may be maintained by, and provided to the onboard vehicle system by, the processing computer 104. By way of illustration, the mobile device 108 may include a keypad capable of allowing a user to input a pin code, whereas the onboard vehicle system 102 may be lacking a keypad. In this illustrative example, the onboard vehicle system 102 may establish communication with the mobile device 108 in order to capture a pin code entered by the user. In some embodiments, mobile device 108 may include an application configured to communicate with the onboard vehicle system 102 and/or the processing computer 104. In some embodiments, at least a portion of the identified relevant authentication policies may be provided by the processing computer directly to the mobile device. The authentication policies provided to the mobile device may be executed on the mobile device and a result set returned to the processing computer. In this way, a transaction may be authenticated even if the account holder is not in possession of the onboard system.

By way of illustrative example, consider a scenario in which an account holder has made an online purchase to be picked up at a specified location. The processing computer may query a DMV database for information related to the account holder, and may receive age-related information (e.g., a date of birth) and/or an image of the account holder (note that this may be done before the transaction; i.e., upon account creation or upon association of a credit card with the account). Assume, for illustrative purposes, that the online purchase described above is for a $45 bottle of bourbon listed as being available for purchase from an online retailer (or a physical retailer with an online presence). In this example, the online retailer's server (i.e., the transaction server) may receive an indication (as part of the transaction) that the user will pick up the purchase at a specified location using his onboard system (e.g., the user may select this option at checkout instead as part of the shipping options). Upon receiving this indication, the online retailer may provide transaction details to the processing computer in order to complete the transaction. The processing computer may determine that the bourbon being purchased is an age-restricted item and that the transaction is over a threshold currency amount of $30 set by the user. For the age restricted item, the processing computer may identify authentication policies that include instructions to verify the user's age based on DMV information and verify that the user is the person in the DMV information. Additionally, the user-set threshold of $30 may be associated with an authentication policy that includes instructions to obtain a password from the user. In some embodiments, a user may set different passwords to be associated with different currency amount thresholds. As a preliminary procedure, the processing computer may first execute the authentication policy to verify the user's age by calculating an age based on date of birth information of the account. In some embodiments, if the user is not of sufficient age to purchase the bourbon, the transaction may be declined.

Continuing with the above example, and assuming that the user is of sufficient age to purchase the bourbon, the processing computer may provide the identified authentication policies to the onboard vehicle system. In this scenario, the onboard vehicle system may execute one or both of the authentication policies provided. The authentication policies may be executed in a sequence or simultaneously. Additionally, in some embodiments, the authentication policies may be executed in a specified order. In this illustrative example, the onboard vehicle system may collect facial data related to the driver and/or one or more passengers of the vehicle via a camera to determine if the account holder is present in the vehicle. Additionally, the onboard vehicle system may prompt the user to enter a password associated with the $30 transaction threshold. In some cases, this may be provided to the account holder's mobile phone. In this example, a successful authentication of both of the provided authentication policies may result in a completion of the transaction.

Note that in this example, one or more of the authentication policies may override, or take the place of, another authentication policy. For example, in the above scenario, the facial recognition performed by the onboard vehicle system may render the password acquisition obsolete (as the facial recognition is likely more accurate than the password acquisition). In some embodiments, less accurate authentication policies may not be executed by the onboard vehicle system.

The authentication policies may each be associated with a failure action, which may provide instructions to be executed upon detecting that the authentication policy has been failed. For example, some authentication policies may instruct the processing computer 104 to prevent completion of the transaction in the event that the authentication policy has been failed. Continuing with the illustrative example above, the processing computer may receive an indication that the password authentication has been successfully completed but the account holder is not present in the vehicle (the identity authentication has failed). In this scenario, the processing computer may assume that the user of the vehicle has permission to use the account (based on the password authentication), but that the user's age has not been verified. In this example, the service provider may be instructed (via a failure action associated with the identity verification policy) to forward instructions to the merchant that the user's identification must be checked in order to verify the user's age. The transaction may be completed upon receiving an indication from the merchant that the user is of sufficient age.

In some embodiments, the authentication policies may include a success action (e.g., additional instructions to be executed upon successful execution of the authentication policy). For example, in the above illustrative example, successful authentication of the user's age and identity may result in the merchant of the bourbon being provided with a message that the account holder's identity and age have already been confirmed.

Figure 4:
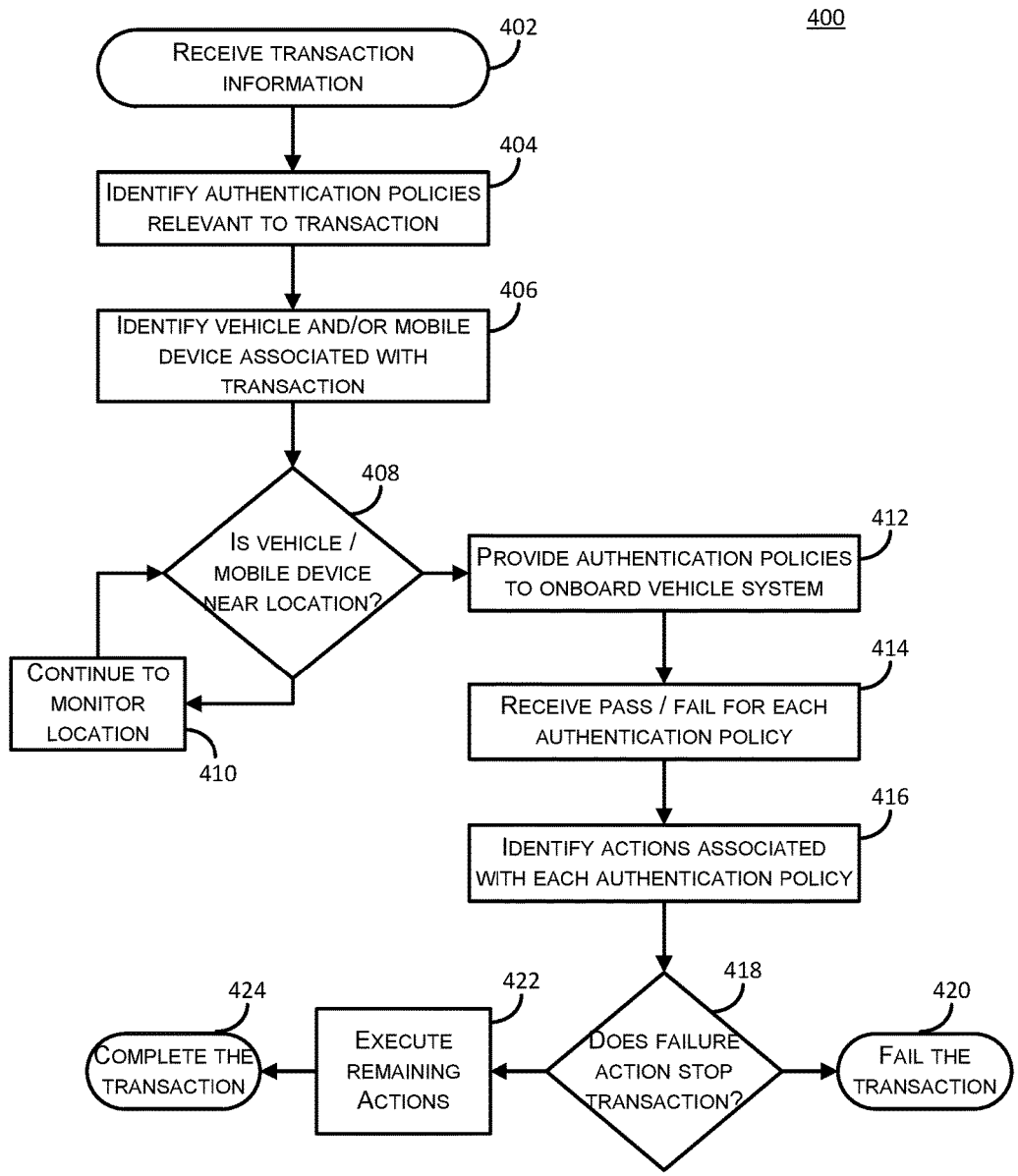
FIG. 4 depicts a flow chart illustrating a process for providing multiple levels of authentication for an onboard system in accordance with at least some embodiments.

FIG. 4 depicts a flow chart illustrating a process for providing multiple levels of authentication for an onboard system in accordance with at least some embodiments. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein. Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 400 of FIG. 4 may be performed by at least the processing computer 104 and/or the onboard vehicle system 102 depicted in FIG. 1. In some embodiments, the processing computer 104 and the onboard vehicle system 102 may be the same entity. The code may be stored on a computer-readable storage medium, for example, in the form of a computer program including a plurality of instructions executable by one or more processors. The computer-readable storage medium may be non-transitory.

Process 400 may begin at 402, when information regarding a transaction is received from a transaction server 106 by a processing computer 104. The received information may include numerous data related to the transaction. For example, the information may include an indication of one or more types of items involved in the transaction, an amount of currency due for the transaction, and/or a location associated with the transaction. The transaction information may also include an indication of an account associated with the transaction. For example, the transaction may be associated with a particular payment instrument or account identifier. An account associated with the transaction may be identified based on the transaction information.

At 404, authentication policies relevant to the transaction may be identified by the processing computer. In some embodiments, relevant authentication policies may be selected based on the information regarding the transaction. For example, the account may include authentication policies associated with currency thresholds and/or item types. In this example, an account holder may specify that a particular authentication technique is to be performed for transactions over the threshold amount and/or transactions involving a particular type of item. An authentication policy may be determined to be relevant based on one or more conditions associated with the authentication being met by the transaction. In some embodiments, the authentication policies relevant to the transaction may be a subset of all of the authentication policies associated with the account. In some embodiments, the authentication policies may be determined to be relevant based on their compatibility with the onboard system. For example, only the subset of authentication policies that may be executed by the onboard system may be determined to be relevant.

In some embodiments, the user may specify multiple currency thresholds to be associated with various authentication policies. For example, a user may log into an account maintained at the processing computer using any device capable of communicating with the processing computer (e.g., any internet connected device or the onboard system) and select various authentication process to be associated with one or more specified conditions. In this example, upon a user selecting an authentication process and conditions, the processing computer may generate an authentication policy based on the user's selection. In this example, a user may specify one or more currency thresholds (an amount of currency for a transaction, over which the authentication process may be executed) and multiple authentication processes. When multiple currency thresholds are associated with various authentication policies, an authentication policy associated with the highest currency threshold may take precedent over other authentication policies. For example, if there are authentication policies associated with $30, and $50, and the transaction is for $60, then in some cases, only the authentication policy associated with the currency amount of $50 may be executed. In some embodiments, authentication policies may be associated with a particular item or type of item. For example, the user may set an authentication policy associated with furniture items. In this example, if the transaction includes a piece of furniture, then the authentication policy associated with the item type furniture may be executed. In some embodiments, authentication policies may be associated with certain item types based on legal requirements. For example, any transaction involving alcohol may be associated with an authentication policy to ensure that the user is at least 21 years of age.

At 406, an onboard system and/or a mobile device associated with the transaction may be identified by the processing computer. For example, the processing computer may query a database for an onboard system identifier and/or mobile device identifier associated with the account. In some embodiments, the account associated with the transaction may be associated with a mobile device and/or an onboard system. For example, an account holder may provide information related to an onboard system or mobile device upon enrollment with the processing computer. In this example, a user may provide a phone number, a serial number, a vehicle identification number (VIN), or any other suitable means of identification.

At 408, a location of the identified onboard system and/or mobile device may be monitored to determine if it is within a vicinity of a location associated with the transaction. For example, the processing computer and/or the onboard system may utilize one or more geo-fencing techniques to determine that the onboard system or mobile device has crossed a virtual barrier or entered within a predetermined distance of a location associated with the transaction (e.g., a location at which the transaction is to be completed). If the location of the identified onboard system is determined not to be within the vicinity of the location associated with the transaction, then the location of the identified onboard system may continue to be monitored at 410.

At 412, upon determining that the location of the identified onboard system is within the vicinity of the location associated with the transaction, the authentication policies relevant to the transaction may be provided to the onboard system by the processing computer. In some embodiments, the onboard system may be provided with the authentication policies prior to the onboard system entering within the vicinity of the transaction location and the authentication policies may not be executed until it is determined that the onboard system is within the vicinity of the location.

At 414, the onboard system may execute each of the received authentication policies to determine a pass/fail indication for each authentication policy. Each authentication policy may include a set of computer executable instructions that, when executed by a processor, cause one or more components of the onboard system to perform an authentication technique. The computer executable instructions may cause various input sensors to activate and collect data related to a condition of the onboard system and/or its user. In some embodiments, the authentication policy may include acceptable data used for comparison purposes. For example, the authentication policy may include a range of acceptable values to be compared to input data collected using the input sensor. Once the input data is collected by the sensors, it may be compared to the acceptable data to determine if the authentication policy is passed or failed. For example, if the input collected by the input sensors falls outside of the acceptable range indicated by the authentication policy, then the authentication policy may be failed. If, on the other hand, the input data collected by the input sensors is within the range of acceptable values, then the authentication policy may be passed. In some embodiments, the authentication policy may involve the execution of a software module or application. For example, an authentication policy may include data associated with a user's facial pattern. Upon activating a camera attached to the onboard system, the onboard system may execute a facial recognition module to determine whether image data collected matches the provided facial patterns. If the image data collected substantially matches the facial patterns (e.g., is within a predetermined range), then the authentication policy may be considered passed.

At 416, one or more actions associated with each of the authentication policies may be identified by the processing computer and/or the onboard system upon determining whether the authentication policy has been passed or failed. Each authentication policy may be associated with a failure action and/or a success action. Upon execution of the authentication policy, one or more of the actions associated with the authentication policy may be executed based on whether execution of the authentication policy resulted in a pass or failure. For example, an authentication policy may be associated with a success action to provide a message to a merchant in a transaction. That same authentication policy may also be associated with a failure action to prevent completion of the transaction. In the event that the authentication policy is executed, the onboard system may initiate the success action upon determining that the authentication policy has passed or it may initiate the failure action upon determining that the authentication policy has failed. An authentication policy may be associated with multiple failure actions and/or success actions.

At 418, it may be determined by the processing computer whether one or more identified failure actions prevents completion of the transaction. For example, if a failure action associated with a failed authentication policy indicates that the transaction should not be completed, then the transaction may be cancelled or declined at 420. Upon making this determination, the processing computer may transmit a failure message to the transaction server, indicating that the transaction should be cancelled. Additionally, the processing computer may provide a failure message to the onboard system so that a user of the onboard system may be notified that the transaction has been cancelled. Upon determining that the transaction should still be completed (e.g., no failed authentication policies are associated with failure actions to prevent the transaction), it may be determined whether additional actions should be executed at 422. For example, a success or failure action may indicate that instructions should be provided to a merchant associated with the transaction. In some embodiments, execution of the additional actions (both success actions and failure actions) may be required before the transaction can be completed. Completion of the transaction may then be initiated at 424.

Illustratively, to complete a transaction, in some embodiments, and referring back to FIG. 1, the processing computer 104 may determine that the authentication policies have been executed and no actions have indicated that the transaction should be stopped. Upon making this determination, the processing computer 104 may provide payment information to the transaction server 106 that may be used to complete the transaction (e.g., credit card information, a payment token, etc.). The transaction server 106 may generate an authorization request message that includes the provided payment information which it may transmit it to the issuer computer 114 via the transaction processing network 116. The issuer computer 114 may determine if the transaction is authorized and may then transmit an authorization response message back to the transaction server 106. At the end of the day or some other period of time, a clearing and settlement process may occur between an acquirer associated with the transaction server 106 and the issuer computer 114. In some embodiments, the processing computer 104 may generate the authorization request message on behalf of the transaction server 106, which it may transmit to the issuer computer 114.

Figure 5:
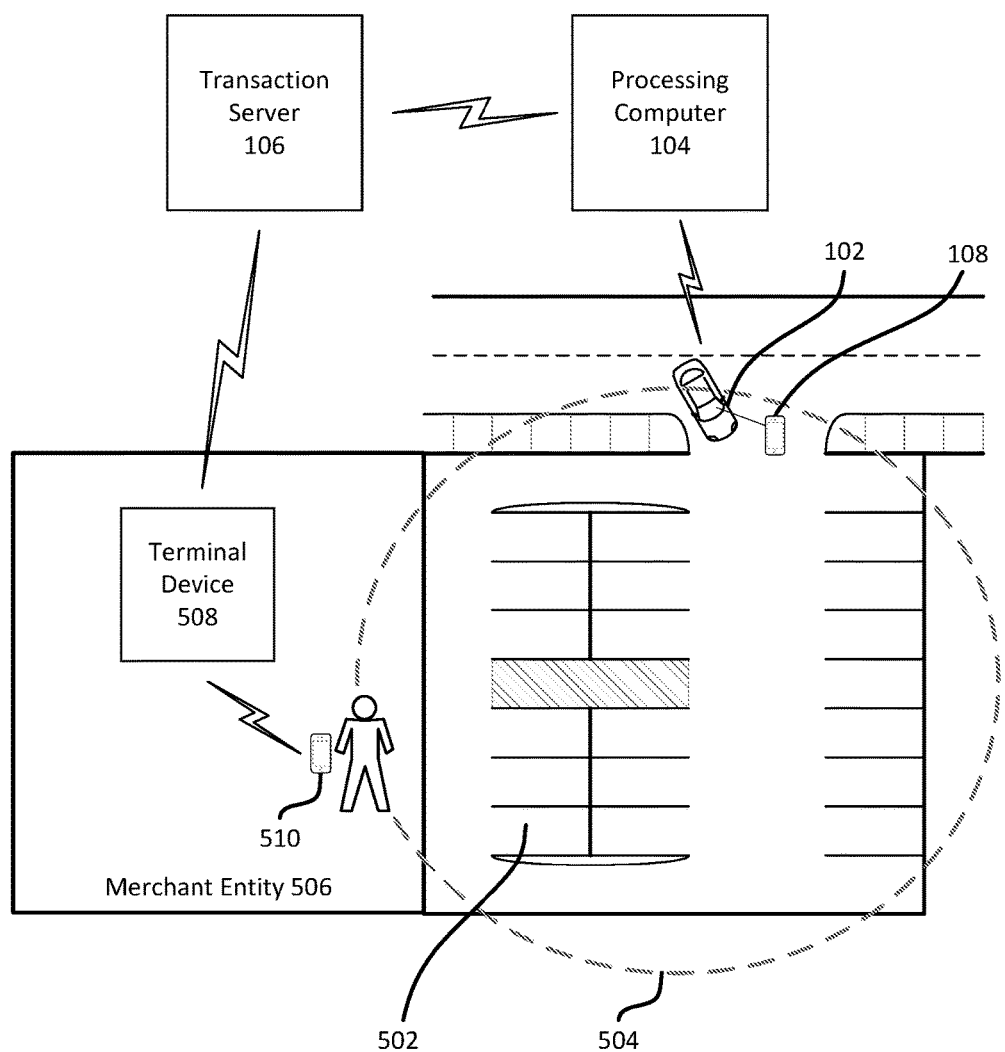
FIG. 5 depicts an illustrative example of a user interaction with a multi-level authentication platform in accordance with at least some embodiments.

FIG. 5 depicts an illustrative example of a user interaction with a multi-level authentication platform in accordance with at least some embodiments. In FIG. 5, a transaction server 106 may receive an indication that a transaction is to be completed. For example, a user may select one or more items available for purchase from an electronic marketplace. In this example, the user may, using a web browser, visit a website owned and/or operated by the transaction server 106 and select items for purchase from an electronic catalog. The user may then elect to initiate a transaction to obtain the items that indicates that the onboard system 102 is to be used to complete the transaction. In some embodiments, the user may select a location 502 to pick up the items involved in the transaction.

In some embodiments, the transaction may be associated with information that the transaction is to be completed using an onboard system 102 installed in a vehicle. For example, the user may select a payment device associated with the onboard system. The transaction server 106 may provide transaction details to a processing computer 104 associated with the onboard system 102 to request authorization to complete the transaction. The processing computer 104 may then identify an account and/or the onboard system 102 from the transaction details. The processing computer 104 may identify one or more authentication policies relevant to the transaction.

In some embodiments, the processing computer 104 may monitor the location of the onboard system 102 to determine if and when the onboard system 102 has crossed a virtual barrier 504 (e.g., a geofence). Upon detecting that the onboard system 102 has crossed the virtual barrier 504, the processing computer 104 may provide the authentication policies to the onboard system 102 to be executed. In some embodiments, the virtual barrier 504 may be some predetermined distance from a physical location 502. The physical location may be associated with a merchant entity 506. For example, the physical location may be a storefront associated with the merchant entity. In some embodiments, the processing computer 104 may provide the authentication policies to the onboard system 102 and the onboard system may monitor its own location to determine when the virtual barrier has been crossed.

Once the onboard system has received the authentication policies from the processing computer 104, it may execute them to authenticate the user of the onboard system (e.g., a driver of a vehicle in which the onboard system is installed). In some embodiments, one or more authentication policies may be used to determine a user's eligibility to purchase particular items. In some embodiments, the failure of an authentication policy related to a particular item may result in that item being removed from the transaction.

In some embodiments, authentication policies may be used to confirm one or more conditions of the transaction, the onboard system, and/or the user of the onboard system. For example, authentication policies associated with certain item types or currency thresholds may be condition based (e.g., the onboard system is or is not exhibiting a particular condition). For example, if the onboard system is traveling erratically (e.g., crossing roadway barrier lines multiple times, traveling over the speed limit, traveling under the speed limit, driving through red lights, etc.), then one or more authentication policies may prevent the purchase of certain items (e.g., alcohol). In some embodiments, the purchase of certain items may be time-based (e.g., the item may only be purchased during specified hours). For example, an authentication policy may specify that alcohol may only be purchased between 6:00 am and 2:00 am. In this example, a transaction to purchase alcohol at 3:00 am may be declined.

In some embodiments, a user may select an authentication policy to be applied to an item in a transaction. For example, when creating the transaction, the user may tentatively select an item. In this example, the user may select the item and associate it with an authentication policy to confirm that the user is still interested in the item prior to completing the purchase. By way of illustration, the user may select several items to be purchased at a merchant entity location, including at least one item that is marked as a tentative purchase. In this illustrative example, the user may ponder whether he or she wants to purchase the item before reaching the location. Upon detecting that the onboard system is within the vicinity of the location, an authentication policy may provide a prompt to the user to determine interest in purchasing the item. For example, the onboard system may provide an audio prompt via the vehicle speaker system asking "are you still interested in purchasing X?," where X is the item marked tentatively. In this example, the user may answer verbally. If the user answers in the negative, then a failure action may result in a removal of the item from the transaction. In some embodiments, the user's response may be compared to audio records associated with the user to confirm the user's identity.

In some embodiments, an authentication policy may compare a location of the onboard system to that of another device. An authentication policy may be used to determine whether an onboard system 102 is located in substantially the same position as a mobile device 108. For example, the onboard system may attempt to establish a communication session with the mobile device 108 via a short range communication channel. In this example, the authentication policy may be failed if the onboard system is unable to establish a communication session with the mobile device. In some embodiments, the processing computer 104 may receive location information from the onboard system 102 as well as from the mobile device 108. The processing computer 104 may subsequently compare the location information for the onboard system 102 to the location information for the mobile device 108 to determine if the mobile device is proximate to the onboard system.

Once each of the authentication policies has been executed, a result set may be generated by the onboard system to include indications of whether each authentication policy has passed or failed. Based on the result set, the processing computer 104 may determine a set of items for which the transaction is to be completed. In some embodiments, upon receiving a result set indicating that each of the authentication policies has passed, the transaction may be authorized by the processing computer 104. In this scenario, the processing computer 104 may provide payment information to the transaction server 106 to complete the transaction. Upon receiving the payment information, the transaction server 106 may initiate completion of the transaction by sending an authorization request message to the issuer of the payment instrument. Upon receiving a positive authorization response message, the transaction server 106 may complete the transaction. In some embodiments, a terminal device 508 at the physical location 502 may receive an indication that the transaction has been completed. The terminal device 508 may transmit a signal to a mobile device 510 operated by an employee or agent of the merchant entity. In some embodiments, the employee may be instructed to bring one or more items involved in the transaction to the vehicle in which the onboard system is installed. In some embodiments, additional instructions may be provided to the mobile device 510 to be displayed to the employee. For example, the employee may be instructed to check the user's identification before completing delivery of the items.

By way of illustration, consider the scenario in which Mr. Smith generates a transaction online. In this example, Mr. Smith may select several items available from a website for purchase, including at least one age-restricted item, and at least one tentative item. Instead of requesting that the items be shipped, Mr. Smith may select an option to pick up the items at a physical location using his onboard vehicle system. In this example, assume that Mrs. Smith (Mr. Smith's spouse) is currently driving the vehicle that includes the onboard vehicle system and intends to pick up the purchase and Mr. Smith is not present. The processing computer may query a DMV database to receive Mr. Smith's driver's license information. Based on this information, the processing computer may verify that Mr. Smith is of sufficient age to purchase the age-restricted item and may subsequently generate a facial pattern from received image information.

In this illustrative example, the processing computer may identify one or more authentication policies relevant to the age-restricted item, one or more authentication policies relevant to currency thresholds, and one or more authentication policies relevant to tentative purchases. Upon detecting that the vehicle driven by Mrs. Smith is within the vicinity of the location indicated in the transaction, each of the identified authentication policies may be provided to, and executed by, the onboard system.

Continuing with the illustrative example, one or more authentication policies relevant to the age-restricted item may be executed by the onboard system. For example, the onboard system may receive facial patterns associated with Mr. Smith in addition to the age-restricted authentication policy. In this example, the onboard system may activate a camera device of the onboard system (or a camera device on the mobile device 108) to capture image information related to the user of the onboard system. The captured image information may be processed and compared to the received facial patterns using one or more facial recognition techniques. In this illustrative example, Mrs. Smith's image may be captured and compared to Mr. Smith's facial patterns, resulting in a failure of the authentication policy. In some embodiments, a failure of this authentication policy may activate the initiation of a failure action to notify an employee of the merchant entity 506 to check for valid identification. Accordingly, the transaction may not be declined in response to determining that the authentication policy has failed. In an alternative embodiment, Mrs. Smith's facial patterns may also be stored by the processing computer in association with Mr. Smith's account (e.g., as an authorized user). The onboard system may compare the captured image information to multiple facial patterns to determine if the user is of suitable age to purchase the age-restricted item.

Continuing with the illustrative example, one or more authentication policies relevant to currency thresholds may also be executed by the onboard system. In some embodiments, multiple authentication policies may be associated with various currency thresholds. In some embodiments, only the most restrictive authentication policy (e.g., the authentication policy associated with the highest currency threshold) may be executed. For example, assume that the transaction conducted by Mr. Smith above is for a total amount of $60. If an authentication policy associated with a $20 threshold requires a verbal confirmation, and an authentication policy associated with a $50 threshold requires entering a pin code, then the onboard system may only require entering a pin code. Authentication policies may also be set to supersede other authentication policies. For example, authentication policies that result in more secure authentications being performed may supersede less secure authentication policies. Given the facts above, assuming that Mrs. Smith's facial recognition has identified her as an authorized user on the account, she may not even be asked for a pin code despite the transaction exceeding the $50 threshold. If, however, Mrs. Smith cannot be identified based on the facial recognition, then she may still be asked to enter a pin code.

Continuing with the illustrative example, one or more authentication policies relevant to tentative purchases may also be executed by the onboard system. In this example, the onboard system may prompt Mrs. Smith to indicate whether she wishes to add the tentative items to the transaction prior to its completion. In another embodiment, Mr. Smith may be prompted to indicate whether he wishes to add the tentative items to the transaction prior to its completion (e.g., via his mobile device).

In some embodiments, a transaction may be initiated via the onboard system. In these embodiments, the processing computer may receive the indication of the transaction from the onboard system instead of from the transaction server. For example, an onboard system may detect an access device (e.g., a point of sale operated by a merchant entity) within its vicinity via a short range communication channel (e.g., NFC, Bluetooth, Bluetooth low-energy (BLE), WiFi, iBeacon, etc). The access device may provide information related to one or more items for purchase to the user. The user may select one or more items available from the merchant entity (e.g., displayed on a display of the onboard system) to be purchased. In some embodiments, the user may select items via a touchscreen, using audio commands, using a mobile device (e.g., the onboard system may be in communication with a user's mobile device), or using any other suitable input sensor of the onboard system. Upon receiving a request to complete the purchase, the onboard system may execute one or more authentication policies before the request is processed. In some embodiments, the onboard system transmits details of the transaction to the processing computer, which subsequently identifies relevant authentication policies to be executed by the onboard system. In some embodiments, the onboard system includes a set of authentication policies and is configured to determine which of those authentication policies is relevant to the transaction. In some embodiments, once the relevant authentication policies have been executed by the onboard system, payment information stored by the onboard system may be provided to the access device to complete the transaction. In some of these embodiments, the onboard system may not be in communication with a processing computer. In some embodiments, once the relevant authentication policies have been executed by the onboard system, a result set or other indication may be provided to a processing computer, which may subsequently transmit a request to complete the transaction to a transaction server associated with the access device.

By way of a second illustration, consider the scenario in which Mrs. Johnson elects to make a purchase using the onboard system without first initiating a transaction through the transaction server. In this example, Mrs. Johnson may approach a merchant entity that supports transaction capabilities using the onboard system. For example, Mrs. Johnson may enter a restaurant drive-thru having a near field communication device. An access device associated with the restaurant may transmit information on a menu of available items to the onboard system via the near field communication device. In this example, the menu may be displayed on a screen of the onboard system. Mrs. Johnson may select one or more of the items from the displayed menu that she would like to purchase and select "purchase" to initiate a transaction. At this point, one or more authentication policies associated with the drive-thru purchase may be identified and executed. Assume, for the purposes of this illustration, that the onboard system has the applicable authentication policies stored in memory and is configured to identify and execute authentication policies relevant to the transaction. In this scenario, the onboard system may identify any conditions relevant to the drive-thru purchase (e.g., currency thresholds, etc.) and may subsequently execute any authentication policies identified as relevant. Upon determining that the transaction has been authenticated (e.g., that no actions associated with an authentication policy result in stopping the transaction), the onboard system may provide stored payment information (e.g., a provisioned credit card number or payment token) to the access device to complete the transaction.

In some embodiments, the multi-level authentication process may be initiated by an employee of the merchant entity. For example, upon receiving an indication that an onboard system is inbound to complete a transaction, the employee may request one or more authentication policies to be executed. In this example, the employee may provide one or more authentication policies to the processing computer 104 to be provided to the onboard system for execution. For example, the employee may determine that one or more items involved in the transaction is an age restricted item. In this scenario, the employee may request an authentication of an age of the person who will pick the item up by requesting that the processing computer 104 provide the relevant authentication policy to the onboard system.

It should be noted that described herein are authentication policies that are intended to assess whether a user of the onboard system is authorized to complete a transaction. However, in some embodiments, the authentication policy may be configured to, upon execution by a processor, cause the onboard system to verify the identity of the user of the onboard system. For example, some item types or transactions may be associated with authentication policies that ensure that a particular person must be present to complete the transaction. For example, an authentication policy may be associated with prescription transactions to require the prescription holder to be present when picking up the prescription.

Figure 6:
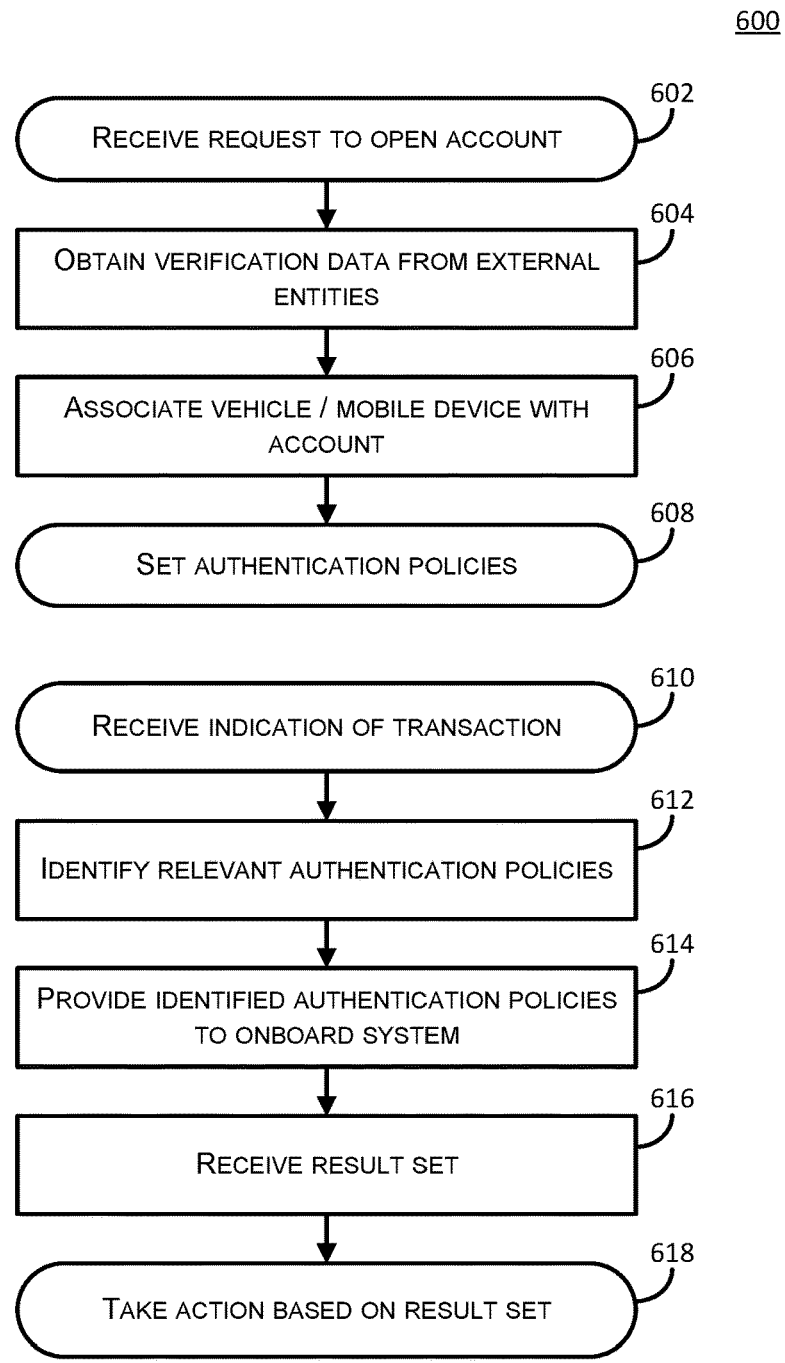
FIG. 6 depicts a flow diagram illustrating a process for processing a transaction using the multi-level authentication platform in accordance with at least some embodiments.

FIG. 6 depicts a flow diagram illustrating a process for processing a transaction using the multi-level authentication platform in accordance with at least some embodiments. In particular, process 600 depicts an example of processing that may be performed by the processing computer throughout an enrollment process and a transaction. In accordance with at least one embodiment, the process 600 of FIG. 6 may be performed by at least the processing computer 104 depicted in FIG. 2.

Process 600 may begin at 602, when a request is received to open an account with a processing computer. The request may be received as a part of an enrollment process, in which a user provides enrollment data. As part of the enrollment process, a user may provider information associated with demographic data, personal data, an indication of a mobile device owned and/or operated by the user, and indication of an onboard system owned and/or operated by the user, or any other suitable information. In some embodiments, the user may provision the account with a payment device. In some embodiments, an account maintained at the processing computer may be associated with one or more database table entries. The user may set a pin code and/or password during the enrollment process.

At 604, verification data may be acquired by the processing computer from external entities. For example, the processing computer may, using details provided by a user, query additional details from one or more third party entities. For example, the processing computer may query a DMV database to obtain a user's license information. The processing computer may store this license information for future use. In another example, the processing computer may query a credit agency for credit information (e.g., a credit score) associated with the user. In yet another example, the processing computer may query one or more entities associated with electronic marketplaces in order to acquire a purchase history for the user. In some embodiments, this may be done without the user's knowledge and/or permission. In some embodiments, the user may be required to sign a waiver prior to the enrollment process.

At 606, a mobile device and/or an onboard system may be associated with the account by the processing computer. In some embodiments, the onboard system may be identified by searching a DMV database. For example, the processing computer may identify one or more vehicles that are registered to the user according to the DMV database. In some embodiments, mobile device identifiers and/or onboard system identifiers may be provided by the user during the enrollment process.

At 608, one or more authentication policies may be set in relation to the account. For example, a user may indicate one or more currency thresholds and authentication policies to which they should be associated. In another example, the user may indicate conditions upon which certain authentication policies should be passed or failed (e.g., acceptable parameters). Some authentication policies may be set automatically by the processing computer. For example, one or more default authentication policies may be set upon enrollment of the account. Default authentication policies may be created by an administrator and applied to all, or a subset of, user accounts. In some embodiments, at least some authentication policies set by the processing computer may not be capable of being edited or overridden by the user. For example, an authentication policy related to age restricted items may be incapable of being altered by a user of the account.

At 610, the processing computer may receive an indication of a transaction from a transaction server (e.g., the processing computer receives transaction details related to a transaction to be completed using the onboard system). Once the enrollment process described above has been completed, a user may wish to use the account to complete a transaction. In some embodiments, a transaction server may receive an indication that the processing computer is involved in a transaction to be completed by the transaction server. The transaction server may provide information associated with the transaction to the processing computer. For example, the transaction server may provide a location at which the transaction is to be completed, a currency amount associated with the transaction, information on one or more items involved in the transaction, or any other suitable transaction-related information.

At 612, the processing computer may identify authentication policies relevant to the transaction. In some embodiments, relevant authentication policies may be identified based on the provided transaction information. In some embodiments, relevant authentication policies may be identified based on their compatibility with the onboard system associated with the account. For example, if the onboard system includes cameras capable of collecting image data, but no microphones, then authentication techniques involving image recognition may be selected whereas authentication techniques involving audio recognition may not be selected. In some embodiments, authentication policies may be determined to be relevant based on context or conditions. For example, some authentication policies may be relevant within particular seasons or timeframes.

At 614, the identified authentication policies may be provided to the onboard system. In some embodiments, the authentication policies may be provided as xml or text-based documents. In some embodiments, multiple versions of each authentication technique may be stored on the processing computer such that each version is compatible with a different onboard system. In this scenario, the processing computer may select the version of each authentication policy compatible with the identified onboard system to be provided. In some embodiments, the authentication policies may be provided in a function call. For example, the processing computer may call a function supported by the onboard system and may pass the authentication policies to the onboard system as parameters in the function call.

At 616, the processing computer may receive a result set from the onboard system. The result set may be generated by the onboard system upon executing each of the provided authentication policies and identifying whether each has passed or failed. In some embodiments, the result set may be provided as a string of characters. In some embodiments, the result set may be provided as an xml or text-based document. In some embodiments, the result set may be provided to the processing computer as a return parameter of a function call.

At 618, one or more actions may be taken in accordance with the result set. In some embodiments, each authentication policy may be associated with failure actions and/or success actions. Upon receiving the result set from the onboard system, the processing computer may process each result in the result set and may execute success actions and/or failure actions associated with each authentication policy based on the indicated pass/fail for that authentication policy. In some embodiments, an action may prevent completion of the transaction or cause it to be declined. In some embodiments, an action may cause another authentication policy to be provided to the onboard system for authentication prior to enabling completion of the transaction.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention provide for user customization of transaction security. In this example, customers are able to dictate what proportion of convenience to security they are comfortable with by setting particular authentication policies and the circumstances under which they are executed. Additionally, the invention provides for improved security and convenience by enabling the automatic execution of various authentication policies without requiring user intervention. Transactions conducted using this invention may be authorized and completed before a user even arrives at the location, enabling an efficient and convenient means of securing transactions.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of authenticating a transaction via an onboard system, the method comprising:
   receiving, by a processing computer, information associated with a transaction conducted using an account;
   identifying, by the processing computer, a set of authentication policies associated with the account;
   identifying, by the processing computer, an onboard system associated with the account;
   determining, by the processing computer, based at least in part on the information associated with the transaction that includes at least one of and item type or currency amount associated with the transaction, a subset of the set of authentication policies relevant to the transaction, the subset of the set of authentication policies being determined based on the information associated with the transaction and being compatible with the identified onboard system, wherein the subset of authentication policies is less than the set of authentication policies and each authentication policy in the subset of authentication policies is determined to be relevant based on one or more of the item type or currency amount associated with the transaction;
   providing instructions to the identified onboard system to cause the onboard system to activate one or more input sensors to collect information related to authentication policies in the subset of authentication policies;
   receiving, from the onboard system, the information related to authentication policies in the subset of authentication policies;
   determining, based on the received information, whether each of the authentication policies in the subset of authentication policies has been satisfied; and
   processing the transaction based on the determination as to whether each of the authentication policies in the subset of authentication policies has been satisfied.

2. The method of claim 1, further comprising:
   providing the subset of the set of authentication policies to the onboard system; and
   receiving a result set from the onboard system, the result set including a pass/fail indication for each of the subset of the set of authentication policies.

3. The method of claim 2, further comprising taking at least one action associated with the subset of the set of authentication policies based at least in part on the result set.

4. The method of claim 1, wherein at least one authentication policy of the subset of the set of authentication policies comprises instructions to request authentication from a mobile device associated with the account.

5. The method of claim 4, wherein the instructions to request authentication from a mobile device associated with the account include instructions for the onboard system to establish a short range communication session with the mobile device.

6. The method of claim 1, wherein at least one authentication policy of the subset of the set of authentication policies comprises instructions to:
   activate at least one sensor of the onboard system to collect sensor input data;
   compare the collected sensor input data to data associated with the account; and
   determine whether the collected sensor input data is within an acceptable range of the data associated with the account.

7. A processing computer, comprising:
   a processor; and
   a memory including instructions that, when executed with the processor, cause the processing computer to, at least:
   receive, from a processing computer, transaction information associated with a transaction to be completed;
   identify an onboard system associated with the account;
   determine, based at least in part on the information associated with the transaction that includes at least one of an item type or currency amount associated with the transaction, a set of authentication policies relevant to the transaction such that the set of authentication policies is compatible with the identified onboard system;
   determine, based at least in part on the information associated with the transaction, a subset of the set of authentication policies relevant to the transaction, the subset of the set of authentication policies being determined based on the information associated with the transaction, wherein the subset of authentication policies is less than the set of authentication policies and each authentication policy in the subset of authentication policies is determined to be relevant based on one or more of the item type or currency amount associated with the transaction, wherein the subset of policies are used to authenticate the transaction.

8. The processing computer of claim 7, wherein the transaction to be completed is associated with a physical location, and wherein the set of authentication policies are provided to the onboard system upon detecting that the onboard system is within a predetermined distance from the physical location.

9. The processing computer of claim 7, wherein the instructions further cause the processing computer to:
   execute a failure action associated with each failed authentication policy in the set of authentication policies; and
   execute a success action associated with each passed authentication policy in the set of authentication policies.

10. The processing computer of claim 7, wherein the instructions further cause the processing computer to initiate completion of the transaction based on the result set.

11. A method of authenticating an user of an onboard system, comprising:

receiving, from a processing computer, transaction information associated with a transaction to be completed;
identifying, based at least in part on one or more conditions indicated in the transaction information that includes at least one of an item type or currency amount associated with the transaction, a set of authentication policies to be executed to authenticate a user of the onboard system, wherein the set of authentication policies is less than a number of authentication policies available and is identified based on at least one of the item type or currency amount associated with the transaction;
executing each authentication policy in the set of authentication policies;
generating a result set to include a pass/fail indicator for each authentication policy in the set of authentication policies; and
providing the result set to the processing computer, such that the processing computer is cause to execute at least one additional action based on the generated result set, wherein the at least one additional action comprises at least one of a failure action based on a fail indicator associated with at least one authentication policy in the set of authentication policies or a success action based on a pass indicator associated with at least one authentication policy in the set of authentication policies.

12. The method of claim 11, wherein executing each authentication policy in the set of authentication policies comprises:
activating an input sensor associated with the onboard system;
collecting input data from the input sensor; and
comparing the input data collected from the input sensor to acceptable parameters.

13. An onboard system, comprising:
one or more input sensors;
a processor; and
a memory including instructions that, when executed with the processor, cause the onboard system to, at least:
receive, from a processing computer, transaction information associated with a transaction to be completed;
identify, based at least in part on one or more conditions indicated in the transaction information that includes at least on of an item type or currency amount associated with the transaction, a set of authentication policies to be executed, the set of authentication policies configured to authenticate a user of the onboard system, wherein the set of authentication policies is less than a number of authentication policies available and is identified based on at least one of the item type or currency amount associated with the transaction;
generate a result set by, for each authentication policy in the set of authentication policies:
activating at least one of the one or more input sensors to collect input data related to the user of the onboard system; and
determining, based on the input data, whether one or more conditions specified in the authentication policy is met; and
providing the result set to the processing computer.

14. The onboard system of claim 13, wherein the one or more conditions specified in the authentication policy are time-based conditions.

15. The onboard system of claim 13, wherein the one or more input sensors includes at least one of a keyboard, a mouse, a microphone, a camera, a motion sensor, a accelerometer, a pressure sensor, a thermometer, or a global positioning system (GPS) device.

16. The onboard system of claim 13, wherein determining whether one or more conditions specified in the authentication policy is met comprises determining whether the collected input data is within provided parameters.

17. The method of claim 1, wherein the subset of the set of authentication policies is determined based at least in part on one or more capabilities associated with the identified onboard system.

18. The method of claim 1, wherein the subset of the set of authentication policies is determined based at least in part on the transaction exceeding one or more currency thresholds, wherein the subset of the set of authentication policies includes different authentication policies based on whether the transaction is for an amount above or below the one or more currency thresholds.

19. The method of claim 1, wherein each authentication policy in the subset of authentication policies includes at least one failure action and at least one success action, the failure action indicating an action to be taken in the event that the policy is not satisfied, and the success action indicating an action to be taken in the event that the policy is satisfied.

20. The method of claim 1, wherein the onboard system is installed within a vehicle.

21. The method of claim 19, wherein the at least one failure action does not prevent completion of the transaction.

22. The method of claim 1, wherein one of more of the authentication policies in the set of authentication policies are set by a user associated with the account.

* * * * *

UNITED STATES PATENT AND TRADEMARK OFFICE
CERTIFICATE OF CORRECTION

PATENT NO.       : 10,044,697 B2
APPLICATION NO.  : 15/074908
DATED            : August 7, 2018
INVENTOR(S)      : Nancy Kim et al.

Page 1 of 1

It is certified that error appears in the above-identified patent and that said Letters Patent is hereby corrected as shown below:

In the Claims

Column 27, Claim 1, Line 34 please remove "at least one of and item" and insert -- at least one of an item --

Column 29, Claim 13, Line 45 please remove "at least on of an item" and insert -- at least one of an item --

Column 30, Claim 22, Line 47 please remove "one of more" and insert -- one or more --

Signed and Sealed this
Ninth Day of October, 2018

Andrei Iancu
*Director of the United States Patent and Trademark Office*